(12) United States Patent
Cooley (10) Patent No.: US 10,479,232 B2
(45) Date of Patent: Nov. 19, 2019

(54) PASSENGER SUPPORT AND METHODS OF USE (71) Applicant: Faurecia Automotive Seating, LLC, Auburn Hills, MI (US)

(72) Inventor: Thomas J. Cooley, Lapeer, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 301 days.

(21) Appl. No.: 15/449,148

(22) Filed: Mar. 3, 2017

(65) Prior Publication Data

US 2017/0253146 A1 Sep. 7, 2017

Related U.S. Application Data

(60) Provisional application No. 62/303,351, filed on Mar. 3, 2016.

(51) Int. Cl.
*B60N 2/12* (2006.01)
*B60N 2/90* (2018.01)

(52) U.S. Cl.
CPC ............. *B60N 2/12* (2013.01); *B60N 2/123* (2013.01); *B60N 2002/126* (2013.01); *B60N 2002/957* (2018.02)

(58) Field of Classification Search
CPC ........ B60N 2/12; B60N 2/3031; B60N 2/305; B60N 2/4855; B60N 2/123; B60N 2/0862; B60N 2002/957; B60N 2002/126
USPC .................... 297/378.13, 325, 336, 335, 331
See application file for complete search history.

(56) References Cited

U.S. PATENT DOCUMENTS

| 4,707,030 | A | * | 11/1987 | Harding | B60N 2/123 248/430 |
| 5,626,392 | A | * | 5/1997 | Bauer | B60N 2/0705 297/341 |
| 6,048,030 | A | * | 4/2000 | Kanda | B60N 2/123 297/341 |
| 6,629,730 | B2 | | 10/2003 | Makosa | |
| 7,100,984 | B2 | * | 9/2006 | Epaud | B60N 2/06 297/341 |
| 7,134,703 | B2 | * | 11/2006 | Jeong | B60N 2/01583 296/65.03 |
| 8,038,210 | B2 | | 10/2011 | Telesco | |
| 8,317,263 | B2 | | 11/2012 | Telesco | |
| 2003/0025373 | A1 | * | 2/2003 | Shinozaki | B60N 2/01583 297/340 |
| 2003/0193228 | A1 | * | 10/2003 | Duquesnay | B60N 2/01583 297/326 |
| 2006/0006687 | A1 | * | 1/2006 | Jeong | B60N 2/01583 296/65.03 |
| 2011/0233368 | A1 | * | 9/2011 | Nihonmatsu | B60N 2/0705 248/429 |
| 2012/0168595 | A1 | * | 7/2012 | Gray | B60N 2/0818 248/429 |

(Continued)

FOREIGN PATENT DOCUMENTS

WO 2006032975 3/2006

*Primary Examiner* — Theodore V Adamos
(74) *Attorney, Agent, or Firm* — Barnes & Thornburg LLP (57) ABSTRACT

A passenger support includes vehicle seat having a seat base mounted to a track for sliding the seat base longitudinally. A sliding motion controller is provided. The seat base is movable from a slid-back configuration to a forward-seating configuration when the sliding motion controller is activated.

14 Claims, 14 Drawing Sheets

(56) References Cited

U.S. PATENT DOCUMENTS

| | | | |
|---|---|---|---|
| 2012/0223561 A1* | 9/2012 | Hurst, III | B60N 2/12 297/344.1 |
| 2013/0292982 A1* | 11/2013 | Radermacher | B60N 2/12 297/318 |
| 2015/0083882 A1* | 3/2015 | Stutika | B60N 2/0722 248/429 |
| 2015/0375637 A1* | 12/2015 | Kikuchi | B60N 2/12 297/317 |
| 2016/0318424 A1* | 11/2016 | Dlugokecki | B60N 2/12 |

* cited by examiner

PASSENGER SUPPORT AND METHODS OF USE

PRIORITY CLAIM

This application claims priority under 35 U.S.C. § 119(e) to U.S. Provisional Application Ser. No. 62/303,351, filed Mar. 3, 2016, which is expressly incorporated by reference herein.

BACKGROUND

The present disclosure relates to vehicle seats, and particularly to movable vehicle seats. More particularly, the present disclosure relates to motion-control mechanisms included in movable vehicle seats.

SUMMARY

According to the present disclosure, a passenger support for a vehicle includes a foundation frame configured to be coupled to a vehicle. A vehicle seat including a seat base is mounted to the foundation frame for sliding movement between a slid-back configuration and a slid-forward configuration. The seat base is configured to move from a horizontal-use configuration to a tilted configuration.

In illustrative embodiments, the passenger support further includes a sliding motion controller. The sliding motion controller blocks the seat base from moving to the slid-forward configuration when the sliding motion controller is deactivated. The seat base is movable toward the slid-forward configuration when the sliding motion controller is activated.

In illustrative embodiments, the passenger support further includes a pivoting motion controller. The pivoting motion controller blocks the seat base from moving from the horizontal-use configuration to the tilted configuration when the pivoting motion controller is deactivated. The seat base is movable to the tilted configuration when the pivoting motion controller is activated. A locking mechanism is configured to lock the seat base in the tilted configuration as the seat base is moved to the slid-forward configuration.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
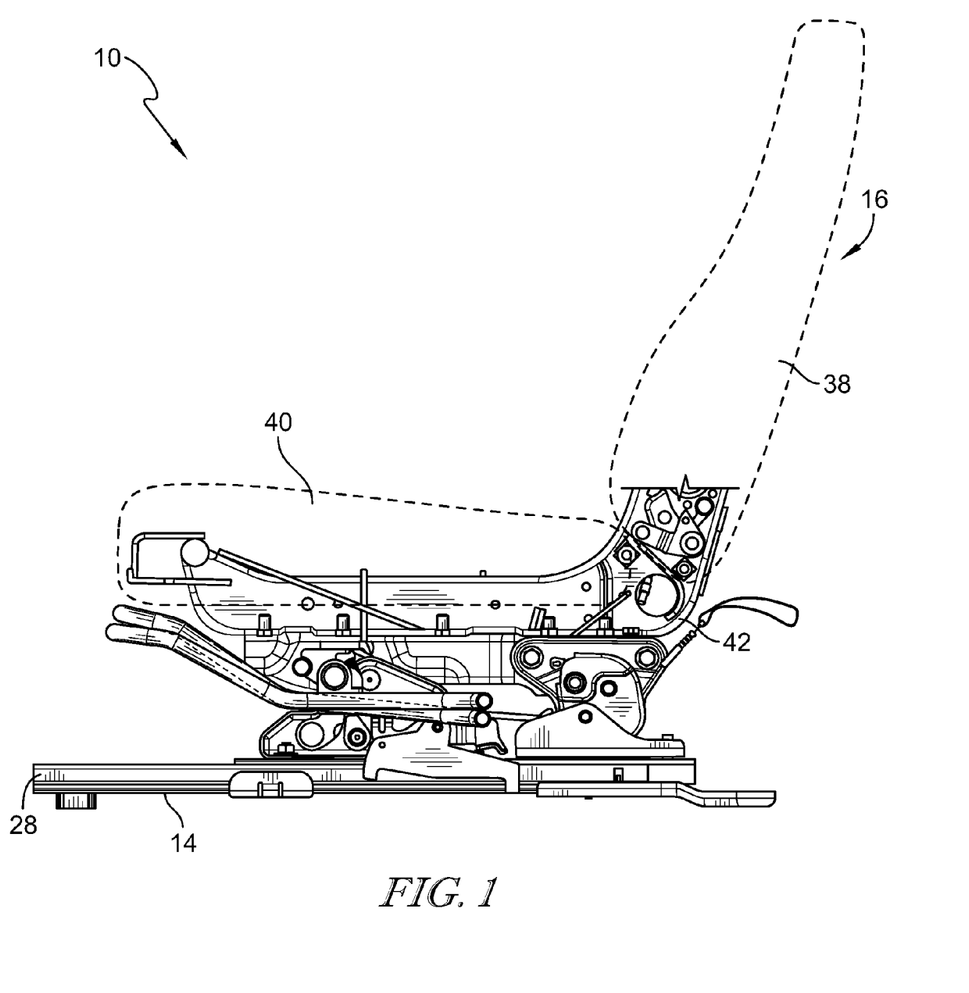
FIG. 1 is an elevation view of a middle-row passenger support having a seat base on a track in a passenger-use configuration.
Figure 2:
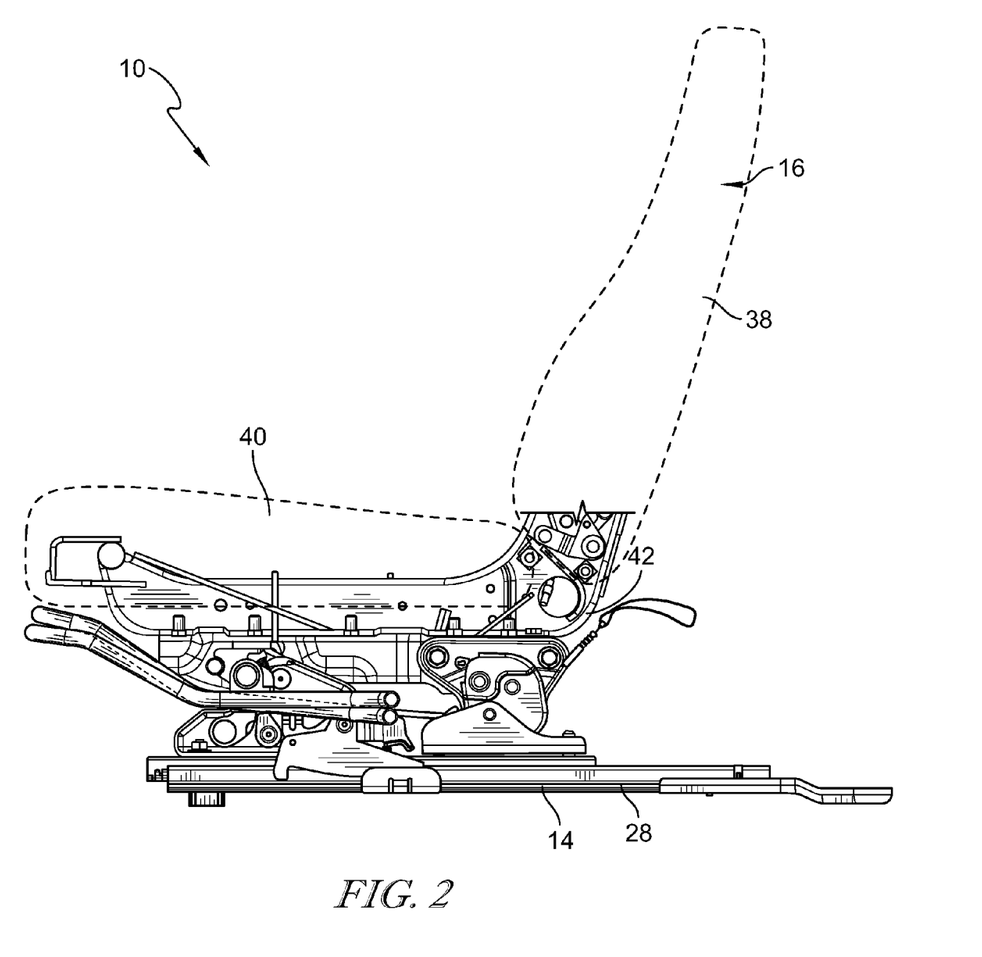
FIG. 2 is a view similar to FIG. 1 showing the seat base moved along the track to a forward-seating configuration.

An illustrative middle-row passenger support 10 for use in a vehicle 12 in accordance with the present disclosure includes a foundation frame 14 coupled to a floor 15 of the vehicle 12 and a vehicle seat 16 mounted on the foundation frame 14 as shown, for example, in FIG. 1. Foundation frame 14 is configured to support vehicle seat 16 above vehicle floor 15 between a front-row passenger support and a back-row passenger support, for example. Vehicle seat 16 moves relative to foundation frame 14 from a passenger-use configuration, shown in FIG. 1, for supporting a passenger during movement of vehicle 12 to a forward-seating configuration, shown in FIG. 2, for supporting a passenger in a forward position. In the forward-seating configuration, the vehicle seat 16 may be tilted to a tilted configuration, shown in FIG. 3, and then moved to a slid-forward configuration or easy entry configuration, shown in FIG. 4, for easy entry into the back-row passenger support.

Vehicle seat 16 includes a seat back 38, a seat bottom 40, and a seat base 42 that are each movable so that vehicle seat 16 can be reconfigured from the passenger-use configuration to the easy-entry configuration as shown in FIGS. 1-4. Seat back 38 is coupled to seat base 42 for pivotable movement about the seat base 42. Seat bottom 40 is coupled to seat back 38 for pivotable movement about the seat back 38. Seat base 42 is coupled to tracks 28 of foundation frame 14 for slidable movement along foundation frame 14 between a slid-back configuration, shown in FIG. 1, and a forward-seating configuration, shown in FIG. 2, and between the forward-seating configuration and a slid-forward configuration, shown in FIG. 4.

Figure 5A:
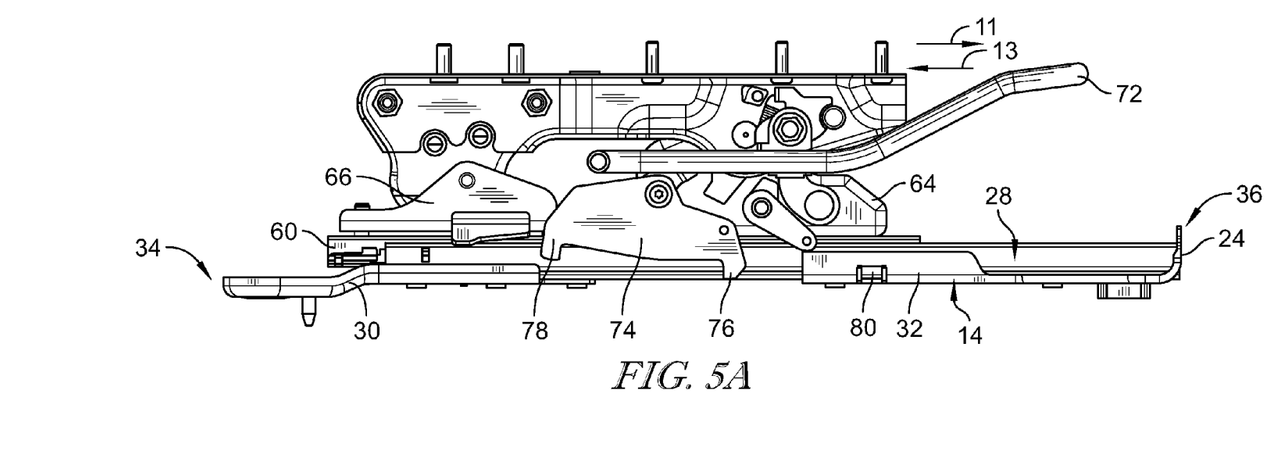
FIG. 5A is an inside view of the seat base in the passenger-use configuration.
Figure 5B:
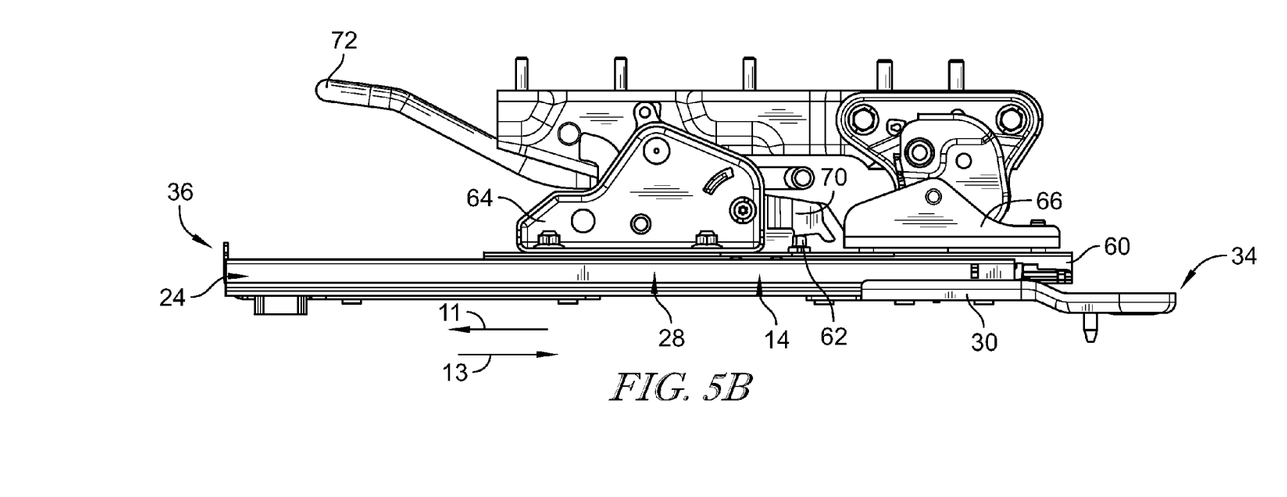
FIG. 5B is an outside view of the seat base in the passenger-use configuration.

Referring to FIGS. 5A and 5B, foundation frame 14 includes at least one rail 24 having a track 28, a rear ramp 30 coupled to track 28, and a forward ramp 32 coupled to track 28. Track 28 is configured to support vehicle seat 16 for motion along track 28 in the direction of arrows 11 and 13. Rear ramp 30 extends along an inboard side of track 28 near a back side 34 of track 28 and may block rearward motion of vehicle seat 16 along track 28. Forward ramp 32 extends along an inboard side of track 28 near a front side 36 of track 28 and may block forward motion of vehicle seat 16 along track 28.

Figure 3:
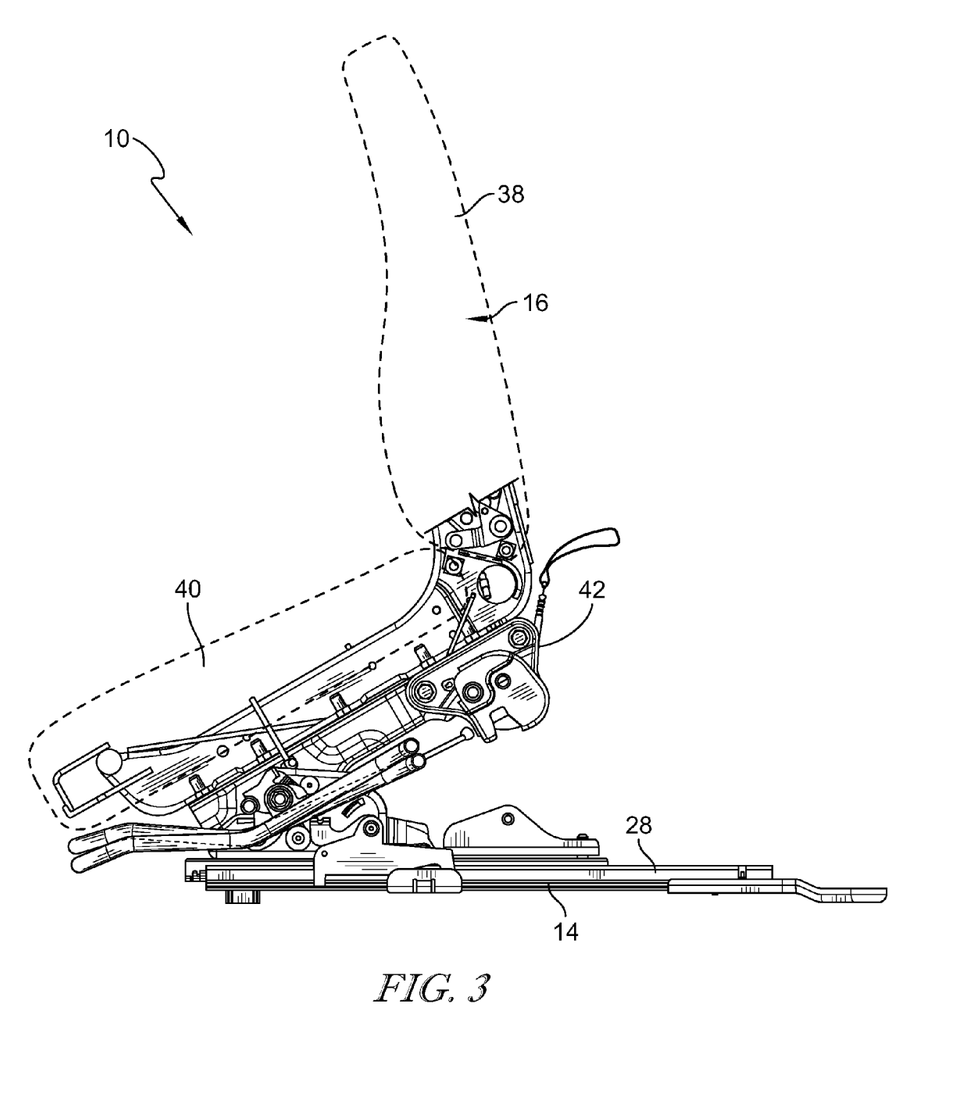
FIG. 3 is a view similar to FIG. 2 showing the seat base moved into a tilted configuration.
Figure 4:
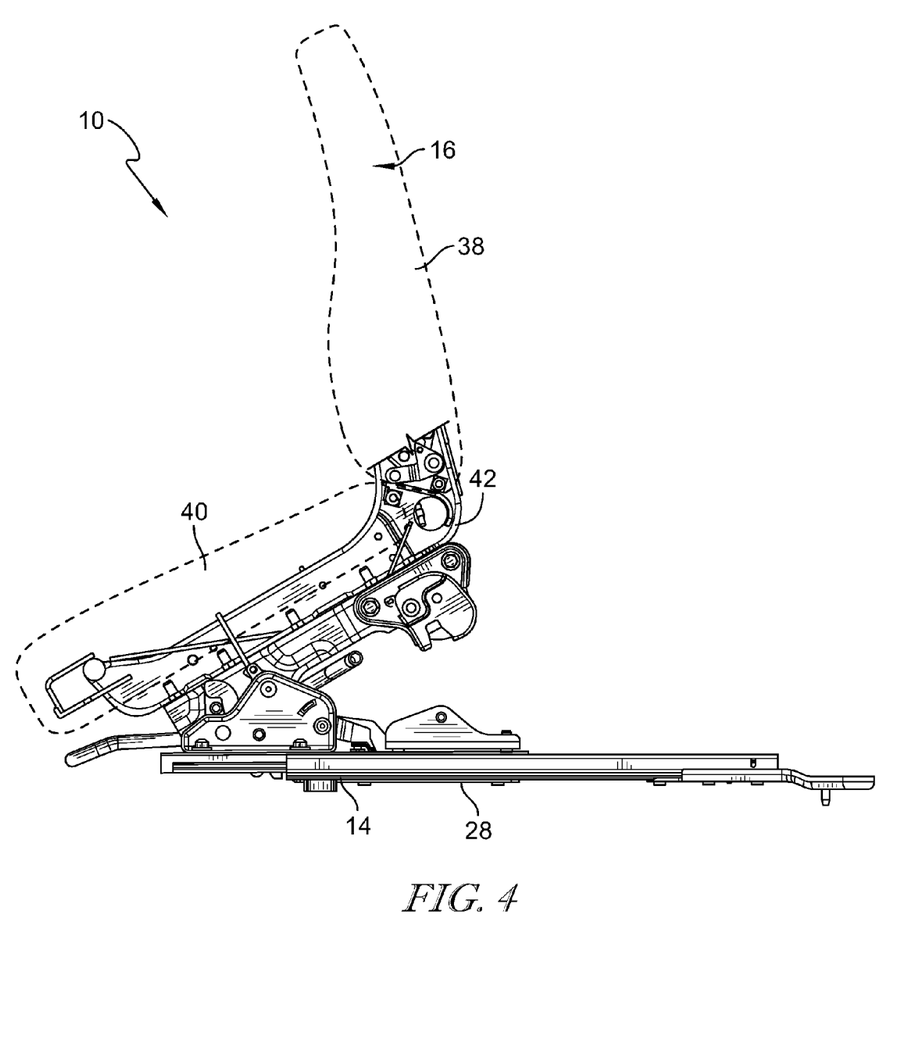
FIG. 4 is a view similar to FIG. 3 showing the seat base moved to a slid-forward configuration while in the tilted configuration.

The seat base 42 includes a slide 60 that translates along the track 28 in the direction of arrows 11 and 13. In the slid-back configuration, the slide 60 is positioned at the rear ramp 30 and locked by a slide latch 62, which blocks movement of the slide 60 along the track 28. The seat base 42 includes a forward base 64 and a rear base 66 coupled to the slide 60. The rear base 66 includes a rear latch 68 that may be activated to release the seat base 42 into a tilted configuration as shown in FIG. 3. The forward base 64 includes a lock lever 70 that activates the slide latch 62 to enable the seat base 42 to slide from a slid-back configuration to a slid-forward configuration.

A handle 72 is coupled to the forward base 64 to actuate the lock lever 70. In one example, the lock lever 70 is also coupled to a longitudinal motion controller 74 that is configured to control and sometimes limit a sliding motion of the seat base 42. The longitudinal motion controller 74 includes a forward tab 76 and a rear tab 78. When the seat base 42 is slid along the track 28, at least one of the forward tab 76 and the rear tab 78 of the longitudinal motion controller 74 may engage the forward ramp 32 to control the sliding motion of the seat base 42. At least one of the forward tab 76 or the rear tab 78 may engage a stopper 80 of the forward ramp 32.

Figure 6A:
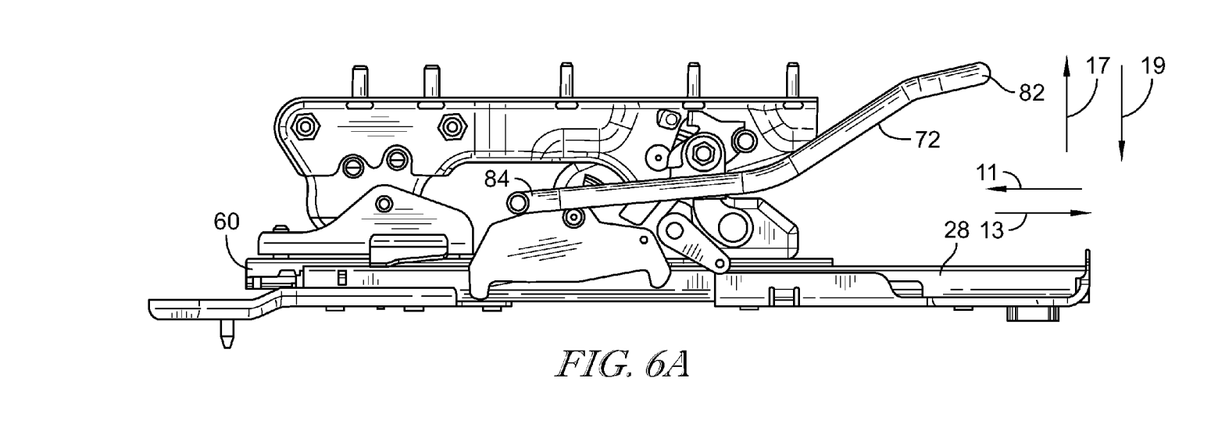
FIG. 6A is an inside view of the seat base with a sliding motion controller activated.
Figure 6B:
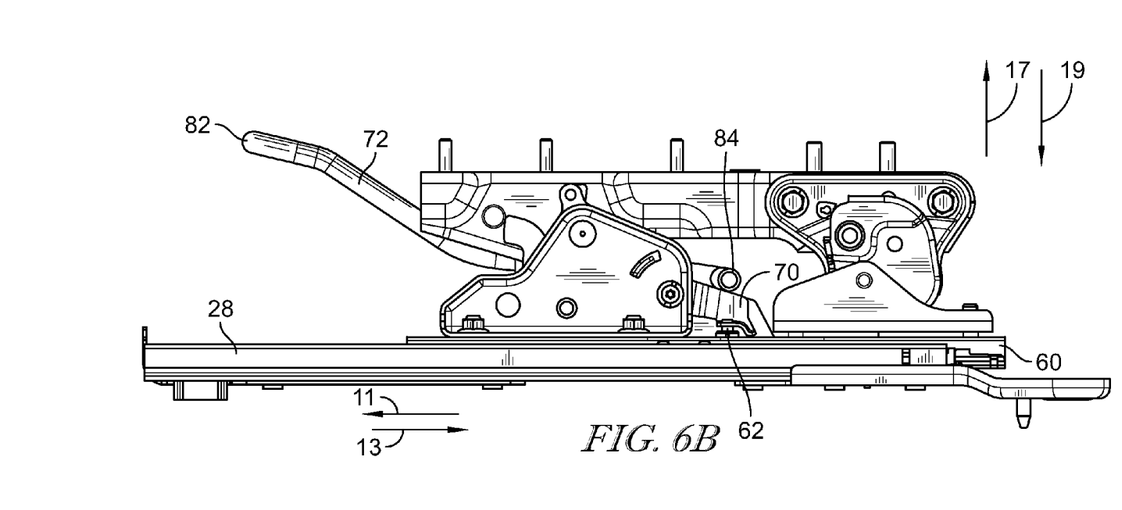
FIG. 6B is an outside view of the seat base with the sliding motion controller activated.
Figure 7A:
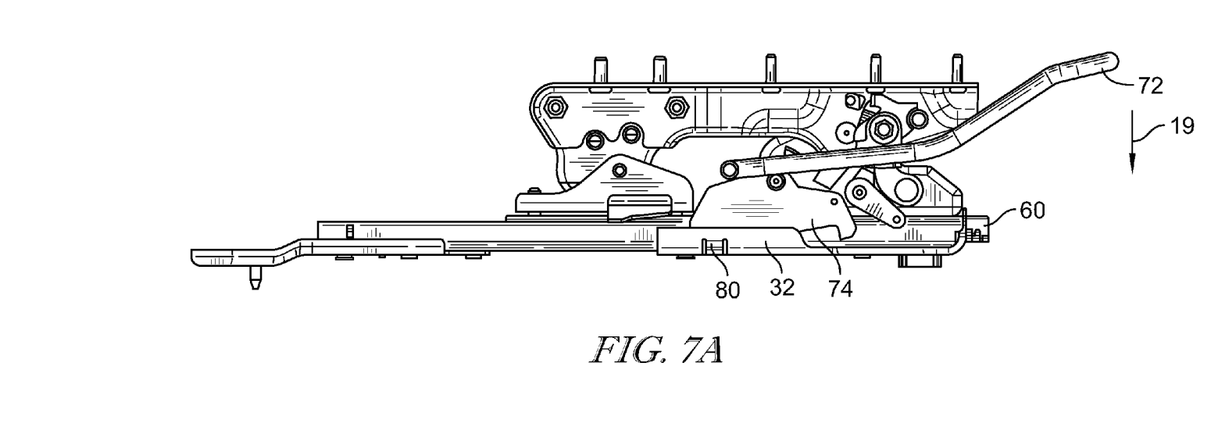
FIG. 7A is an inside view of the seat base moved into the forward-seating configuration while in a horizontal-use configuration.
Figure 7B:
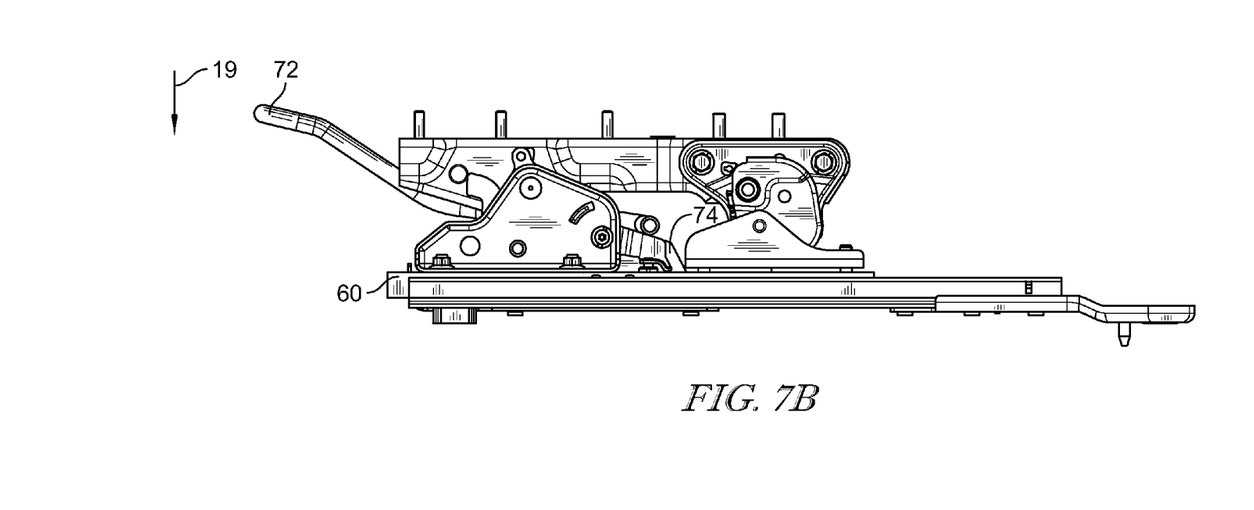
FIG. 7B is an outside view of the seat base moved into the forward-seating configuration while in a horizontal-use configuration.
Figure 8A:
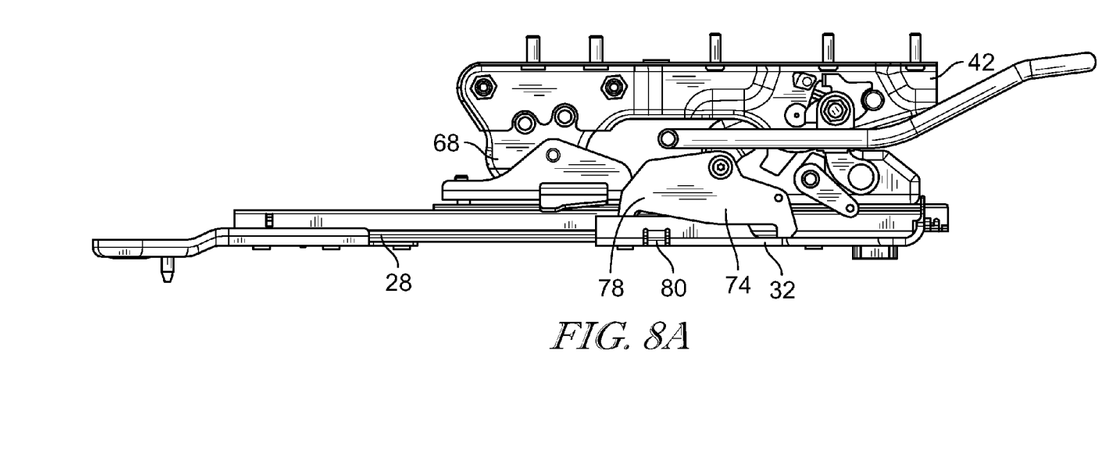
FIG. 8A is an inside view of the seat base in the forward-seating configuration with the sliding motion controller deactivated.
Figure 8B:
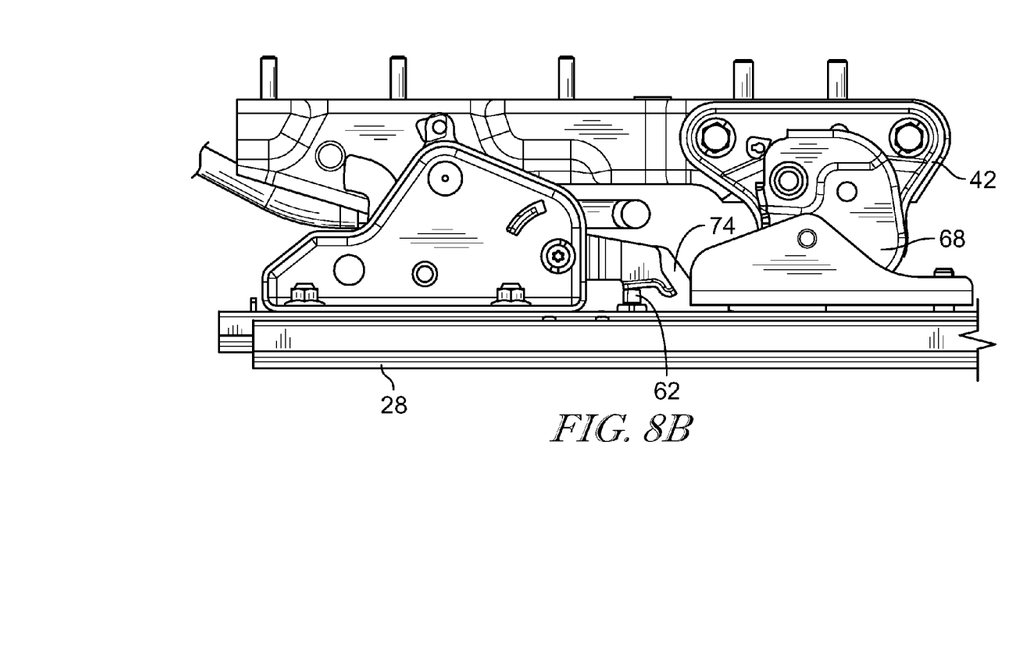
FIG. 8B is an outside view of the seat base in the forward-seating configuration with the sliding motion controller deactivated.

A forward end 82 of the handle 72 is actuated upward in the direction of arrow 17 so that a rear end 84 of the handle 72 pivots downward in the direction of arrow 19 and engages the lock lever 70 as shown, for example, in FIGS. 6A and 6B. The lock lever 70 is pushed downward to release the slide latch 62 so that the slide 60 may move freely about the track 28. Concurrently, the longitudinal motion controller 74 is tilted so that the forward tab 76 is elevated to clear the stopper 80 of the forward ramp 32. With the slide latch 62 released, the slide 60 may be translated forward on the track 28 in the direction of arrow 11 to the forward-seating configuration as shown in FIGS. 7A and 7B. The slide 60 is translated forward until the rear tab 78 of the longitudinal motion controller 74 engages the stopper 80 of the forward ramp 32. The vehicle seat 16 in the forward-seating configuration, while also in the horizontal-use configuration such that the vehicle seat 16 can be used by a passenger in a forward position as shown in FIGS. 7A and 7B. The handle 72 is then released so that the rear end 84 of the handle moves in the direction of arrow 19 and disengages the longitudinal motion controller 74 as shown in FIGS. 8A and 8B. By disengaging the longitudinal motion controller 74, the rear tab 78 of the longitudinal motion controller 74 is released from the stopper 80 of the forward ramp 32. Concurrently, the slide latch 62 is released thereby blocking the seat base 42 from sliding along the track 28 in either direction. In the forward-seating configuration, the rear latch 68 may be activated, thereby disengaging the seat base 42 from the rear base 66.

Figure 9A:
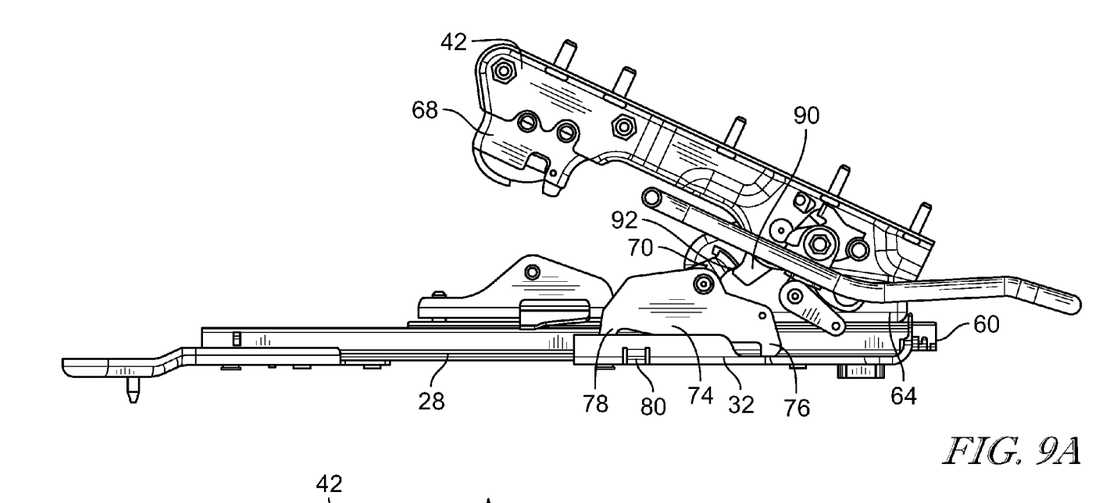
FIG. 9A is an inside view of the seat base with a pivot motion controller activated to move the seat base from the horizontal-use configuration to the tilted configuration.
Figure 9B:
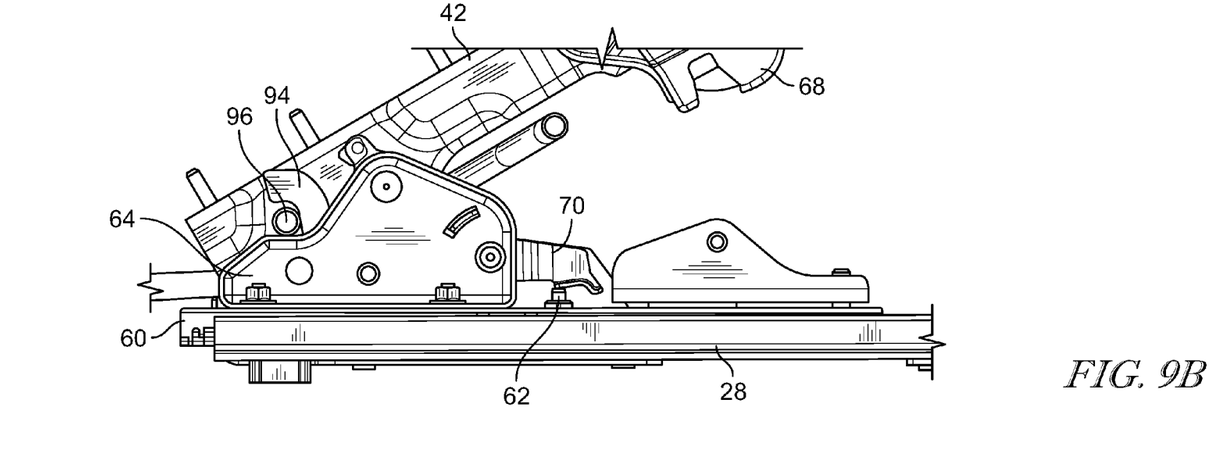
FIG. 9B is an outside view of the seat base with a pivot motion controller activated to move the seat base from the horizontal-use configuration to the tilted configuration.
Figure 10A:
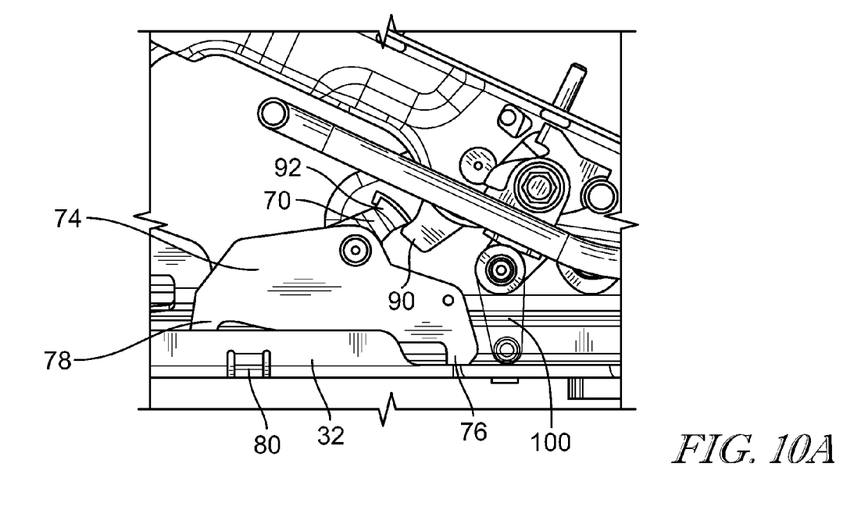
FIG. 10A is an inside view of the seat base in the tilted configuration with a locking link engaging a lock lever.
Figure 10B:
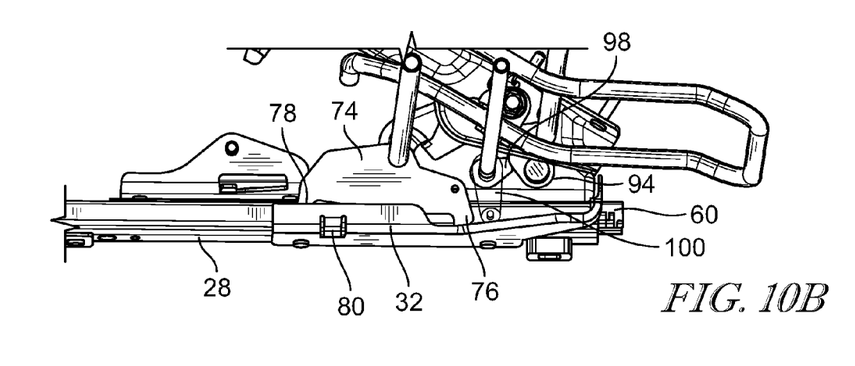
FIG. 10B is an inside view of the seat base in the tilted configuration with a cam engaging a lock.
Figure 10C:
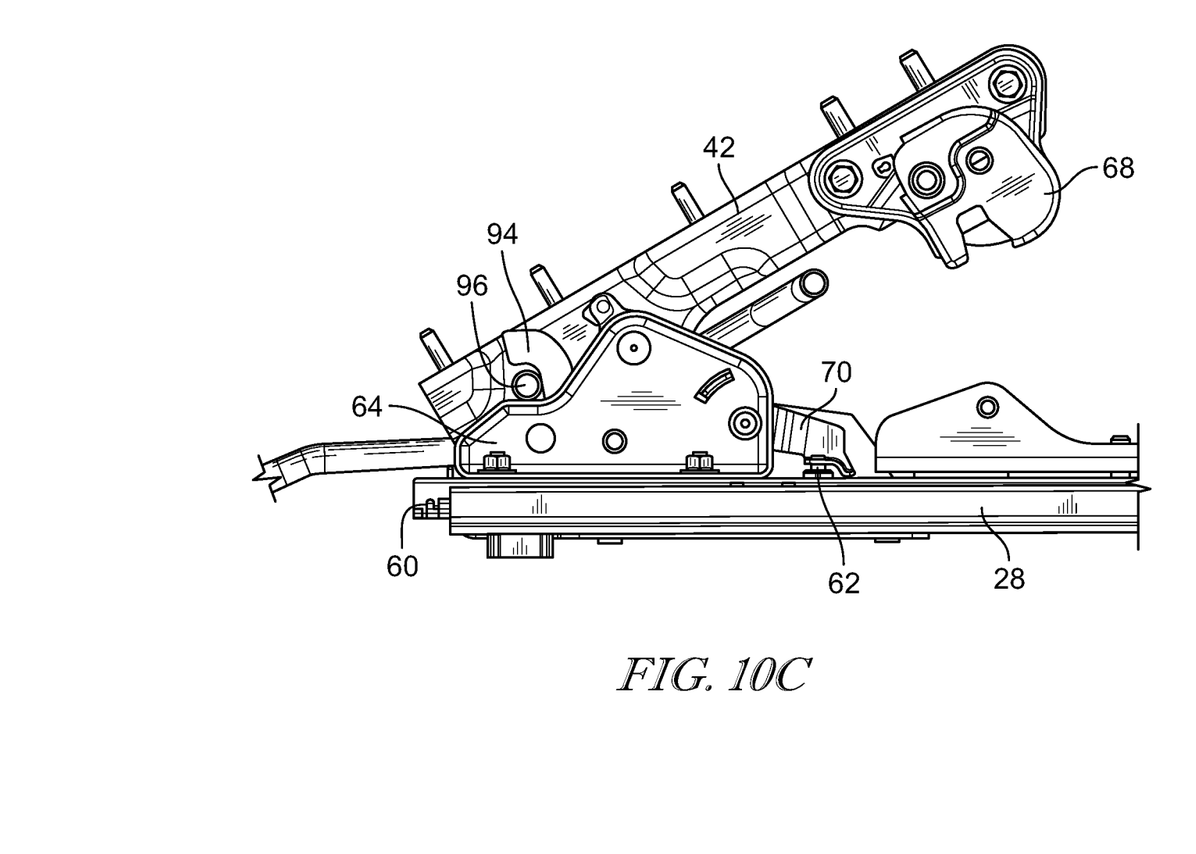
FIG. 10C is an outside view of the seat base in the tilted configuration with the lock of FIG. 10B engaging a locking pin.

By releasing the rear latch 68, the seat base 42, and consequently the vehicle seat 16, may be tilted about the forward base 64 as suggested in FIGS. 9A and 9B. The vehicle seat 16 is tilted into the tilted configuration as shown in FIG. 3. As illustrated in FIG. 9A, as the seat base 42 is tilted into the tilted configuration, an unlocking link 90 of the seat base 42 engages a top end 92 of the lock lever 70. As illustrated in FIG. 10A, the unlocking link 90 biases the lock lever 70 as the seat base 42 is rotated upward. The lock lever 70 continues to be biased such that the lock lever 70 engages the slide latch 62, thereby unlocking the slide 60 with respect to the track 28 as shown in FIG. 10C. Because the rear tab 78 of the longitudinal motion controller 74 is released from the stopper 80 of the forward ramp 32, the slide 60 is enabled to continue to move forward on the track 28 due to the slide latch 62 being activated by the lock lever 70. With the longitudinal motion controller 74 in this configuration, the forward tab 76 of the longitudinal motion controller 74 blocks the slide 60, and also the seat base 42, from moving into the slid-back configuration. The forward tab 76 would engage the stopper 80 of the forward ramp 32 if the seat base 42 were slid back in the direction of arrow 13.

Figure 11A:
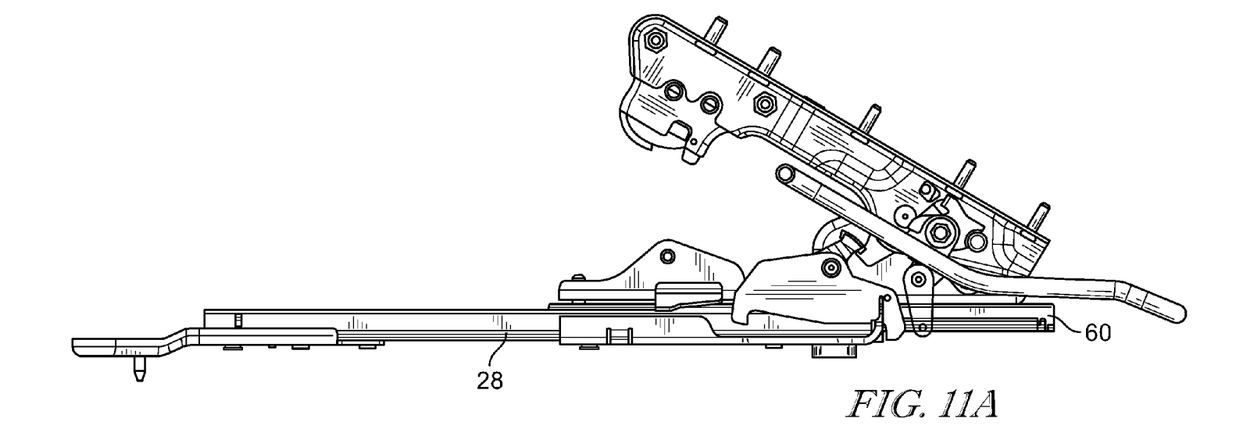
FIG. 11A is an inside view of the seat base moved into in a slid-forward configuration while in the tilted configuration to enable easy entry into a back-row passenger seat.
Figure 11B:
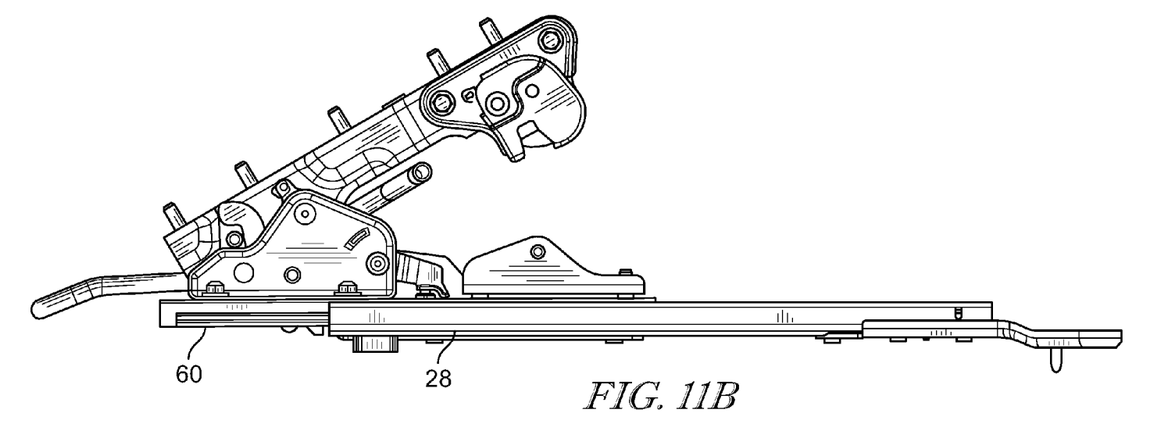
FIG. 11B is an outside view of the seat base moved into in a slid-forward configuration while in the tilted configuration to enable easy entry into a back-row passenger seat.

A lock 94 engages a pin 96 on the seat base 42 as the vehicle seat 16 is moved into the tilted configuration as shown in FIG. 9B. The lock 94 locks the seat base 42 in the tilted configuration such that the seat base 42 cannot be positioned back in the horizontal-use configuration. As the lock 94 moves into engagement with the pin 96, a cam 98 rotates into contact with the lock 94, thereby securing the lock 94 in a locked position against the pin 96 as shown in FIG. 10B. As the cam 98 is rotated into engagement with the lock 94, a roller 100 is rotated downward into a configuration wherein the roller 100 may engage the forward ramp 32. In the configuration illustrated in FIGS. 10A-10C, the vehicle seat 16 may continue to move forward in the direction of arrow 11 while in the tilted configuration. To provide additional space behind the vehicle seat 16, the vehicle seat 16 moves forward to the slid-forward configuration such that the slide 60 extends past the track 28, as illustrated in FIGS. 11A and 11B, thereby providing space behind the middle-row passenger support 10 to enable a passenger to enter the back-row passenger support 22.

Figure 12:
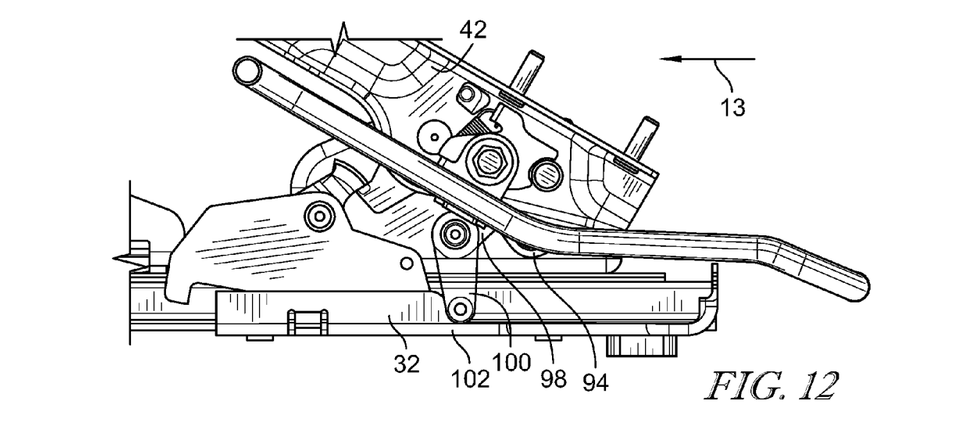
FIG. 12 is an inside view of the seat base slid back into forward-seating configuration while still in the tilted configuration.
Figure 13:
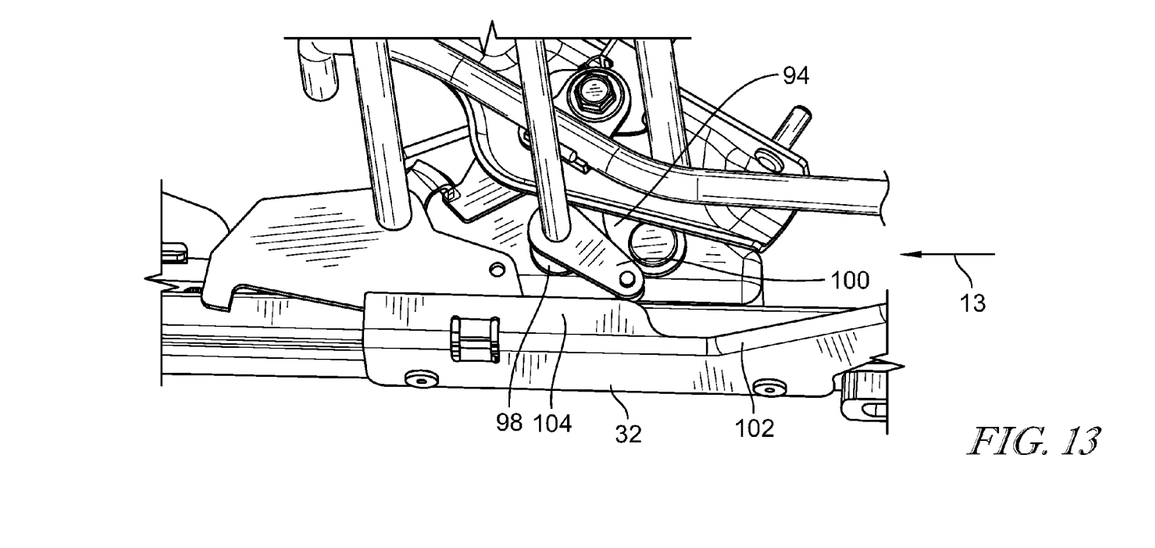
FIG. 13 is an inside view of a roller of the seat base of engaging a forward ramp to release the lock of FIG. 10C from the locking pin of FIG. 10C.
Figure 14:
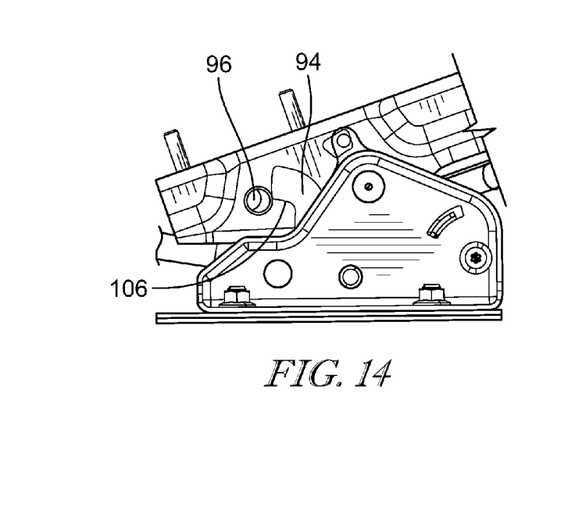
FIG. 14 is an outside view of the lock of FIG. 10C disengaging the locking pin of FIG. 10C.

The process for returning the middle-row passenger support 10 back to the passenger-use configuration is shown starting with FIG. 12. The seat base 42 is slid back in the direction of arrow 13 into the forward-seating configuration, while still in the tilted configuration. As the seat base 42 is slid back into the forward-seating configuration, the roller 100 engages the forward ramp 32. Particularly, the roller 100 first engages a forward end 102 of the forward ramp 32 as shown in FIG. 12. As the seat base 42 continues to move back in the direction of arrow 13, the roller 100 engages a back end 104 of the forward ramp 32 as shown in FIG. 13. The back end 104 of the forward ramp 32 has a height that is greater than a height of the forward end 102 of the forward ramp 32 and causes the roller 100 to rotate. Cam 98 rotates with the roller 100 and disengages the lock 94. When the cam 98 disengages the lock 94, the lock 94 rotates away from the pin 96 due to an angle of a lock engagement surface 106 that is in contact with the pin 96 as shown in FIG. 14. The vehicle seat 16 is moved back into the horizontal-use configuration from the tilted configuration because the cam 98 is no longer engaging and securing the lock 94, the lock 94 slides off of the pin 96.

Figure 15A:
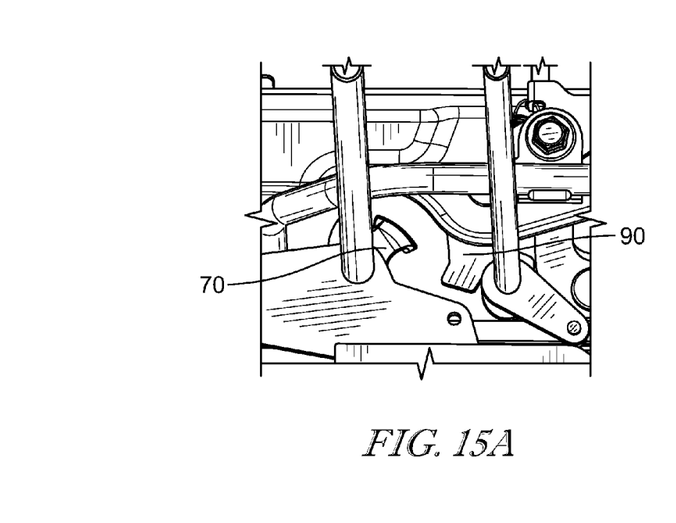
FIG. 15A is an inside view of the locking link of FIG. 10A disengaging the lock lever of FIG. 10A.
Figure 15B:
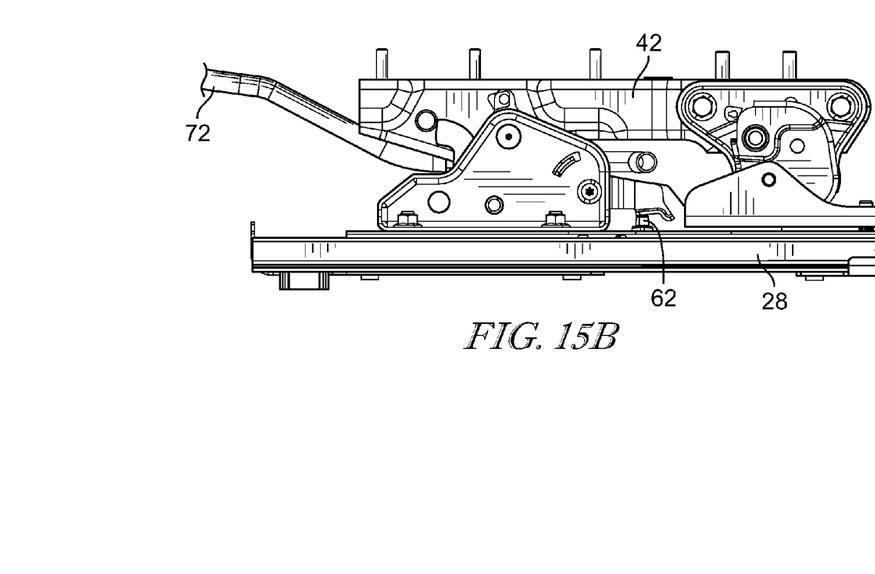
FIG. 15B is an outside view of the seat base of returned to the horizontal use configuration in the forward seating configuration.

The unlocking link 90 is released from the lock lever 70 as the vehicle seat 16 is rotated from the tilted configuration to the horizontal-use configuration as shown in FIG. 15A. The lock lever 70 disengages the slide latch 62 when the unlocking link 90 is released from the lock lever 70. The slide 60 is then locked to the track 28, as illustrated in FIG. 15B, with the seat base 42 in the forward-seating configuration and the horizontal-use configuration. The vehicle seat 16 may be used with the seat base in the horizontal-use configuration and forward-seating configuration. If the user desires to provide additional room in front of the middle-row passenger support 10, the vehicle seat 18 may be moved back to the slid-back configuration in the direction of arrow 13.

By actuating the handle 72, the lock lever 70 engages the slide latch 62, thereby unlocking the slide 60 from the track 28. Concurrently, the longitudinal motion controller 74 is rotated so that the forward tab 76 of the longitudinal motion controller 74 is disengaged from the stopper 80 of the forward ramp 32. In this configuration, the vehicle seat 16 may be returned to the slid back configuration by longitudinally translating the slide 60 along the track 28 in the direction of arrow 13. After being returned to the slid back configuration, the handle 72 may be released to release the lock lever 70 from the slide latch 62, thereby locking the slide 60 to the track 28 with the vehicle seat 16 in the original passenger-use configuration.

Passenger vehicles often include a front-row passenger support, a middle-row passenger support, and a back-row passenger support. The middle-row passenger support may include a frame coupled to the vehicle and a vehicle seat mounted on the frame that moves between a passenger-use configuration and an easy-entry configuration. In the easy-entry configurations, the vehicle seat provides additional space behind the vehicle seat and in front of the back-row passenger support. Such extra space may be useful for a passenger entering/exiting the back-row passenger support or manipulating items behind the vehicle seat of the middle-row passenger support.

The invention claimed is:

1. A passenger support comprising
a foundation frame configured to be coupled to a vehicle,
a vehicle seat including a seat base mounted to the foundation frame for sliding movement between a slid-back configuration and a slid-forward configuration, the seat base configured to move from a horizontal-use configuration to a tilted configuration,
a sliding motion controller configured to block the seat base from moving to the slid-forward configuration when the sliding motion controller is deactivated and to allow the seat base to move toward the slid-forward configuration when the sliding motion controller is activated,
a pivoting motion controller configured to block the seat base from moving from the horizontal-use configuration to the tilted configuration when the pivoting motion controller is deactivated and to allow the seat base to move to the tilted configuration when the pivoting motion controller is activated,
a locking mechanism configured to lock the seat base in the tilted configuration as the seat base is moved to the slid-forward configuration, and
a longitudinal motion controller including a forward tab and a rear tab,
wherein the sliding motion controller comprises a handle that engages the longitudinal motion controller when the sliding motion controller is activated to cause the rear tab to tilt downwardly and engage a stopper when the seat base is moved from the slid-back configuration to a forward-seating configuration between the slid-back configuration and the slid-forward configuration.

2. The passenger support of claim 1, wherein the forward tab of the longitudinal motion controller is tilted away from the stopper when the handle engages the longitudinal motion controller so that the seat base is moveable to the forward-seating configuration.

3. The passenger support of claim 2, wherein the rear tab of the longitudinal motion controller engages the stopper at the forward-seating configuration when the sliding motion controller is activated.

4. The passenger support of claim 3, wherein the pivoting motion controller is activated when the seat base is in the forward-seating configuration to move the seat base to the tilted configuration.

5. The passenger support of claim 4, wherein activating the pivoting motion controller to move the seat base into the tilted configuration disengages the rear tab of the longitudinal motion controller from the stopper so that the seat base is moveable to the slid-forward configuration.

6. The passenger support of claim 1, wherein the locking mechanism further comprises a locking hook and a pin and the locking hook is rotated into engagement with the pin in the tilted configuration to retain the seat base in the tilted configuration.

7. The passenger support of claim 6, wherein the locking mechanism further comprises a cam that locks the locking hook into engagement with the pin.

8. The passenger support of claim 7, further comprising a roller coupled to the cam, the roller engaging a forward ramp of the foundation frame when the seat base is moved from the slid-forward configuration to the forward-seating configuration, the roller rotating the cam to unlock the locking hook so that the seat base is movable from the tilted configuration to the horizontal-use configuration.

9. The passenger support of claim 1, wherein the seat base further comprises a slide that longitudinally moves along a track of the foundation frame.

10. The passenger support of claim 9, further comprising a slide latch to lock the slide to the track of the foundation frame.

11. The passenger support of claim 10, wherein the sliding motion controller engages the slide latch to unlock the slide from the track of the foundation frame.

12. The passenger support of claim 11, wherein the sliding motion controller engages the longitudinal motion controller concurrently with the lock lever to cause the rear tab to tilt downwardly and to engage the stopper when the seat base is in a forward-seating configuration.

13. The passenger support of claim 1, wherein the forward tab and the rearward tab are each mounted to the foundation frame for pivotable movement about a longitudinal motion controller axis relative to one another.

14. A method of moving a passenger support between a passenger-use configuration and an easy entry configuration comprising the steps of activating a sliding motion controller to move a seat base relative to a foundation frame from a slid-back configuration to a forward-seating configuration, activating a pivoting motion controller to move the seat base from a horizontal-use configuration to a tilted configuration when the seat base is in the slid-back seating configuration, locking the seat base in the tilted configuration, and sliding the seat base to a slid-forward configuration when the seat base is locked in the tilted configuration, wherein the seat base further comprises a slide that longitudinally moves along a track of the foundation frame when the seat base is in the horizontal-use configuration and a slide latch to lock the slide to the track of the foundation frame when the sliding motion controller is deactivated and wherein, when activated, the sliding motion controller engages concurrently: (i) the slide latch to unlock the slide from the track of the foundation frame, and (ii) a longitudinal motion controller so that the seat base is blocked from sliding forward past the forward-seating configuration until the pivoting motion controller is activated.

\* \* \* \* \*